US012343576B2

(12) United States Patent  
Linsmeier et al.

(10) Patent No.: US 12,343,576 B2  
(45) Date of Patent: Jul. 1, 2025

(54) SANDWICHED POWER TAKE-OFF (PTO) FOR A VEHICLE

(71) Applicant: Oshkosh Corporation, Oshkosh, WI (US)

(72) Inventors: Eric Linsmeier, Larsen, WI (US); David Fieber, Neenah, WI (US)

(73) Assignee: Oshkosh Corporation, Oshkosh, WI (US)

( * ) Notice: Subject to any disclaimer, the term of this patent is extended or adjusted under 35 U.S.C. 154(b) by 421 days.

(21) Appl. No.: 17/987,006

(22) Filed: Nov. 15, 2022

(65) Prior Publication Data

US 2023/0149754 A1   May 18, 2023

Related U.S. Application Data

(60) Provisional application No. 63/335,681, filed on Apr. 27, 2022, provisional application No. 63/279,944, filed on Nov. 16, 2021.

(51) Int. Cl.
| | |
|---|---|
| *A62C 27/00* | (2006.01) |
| *B60K 17/02* | (2006.01) |
| *B60K 17/24* | (2006.01) |
| *B60K 17/28* | (2006.01) |
| *B60K 25/02* | (2006.01) |

(52) U.S. Cl.  
CPC .............. *A62C 27/00* (2013.01); *B60K 17/02* (2013.01); *B60K 17/24* (2013.01); *B60K 17/28* (2013.01); *B60K 25/02* (2013.01); *B60K 2025/022* (2013.01); *B60Y 2200/14* (2013.01); *B60Y 2300/51* (2013.01)

(58) Field of Classification Search  
CPC ........ A62C 27/00; B60K 17/02; B60K 17/24; B60K 17/28; B60K 25/02; B60K 2025/022; B60Y 2200/14; B60Y 2300/51  
See application file for complete search history.

(56) References Cited

U.S. PATENT DOCUMENTS

| | | | | |
|---|---|---|---|---|
| 4,157,733 | A | * | 6/1979 | Ewers ................. F04C 15/0061 169/24 |
| RE36,196 | E | * | 4/1999 | Eberhardt ................ A62C 5/02 169/14 |
| 6,009,953 | A | * | 1/2000 | Laskaris .................. A62C 5/02 169/15 |
| 6,712,652 | B2 | | 3/2004 | Roycroft |

(Continued)

FOREIGN PATENT DOCUMENTS

| | | |
|---|---|---|
| CN | 2921129 Y | 7/2007 |
| CN | 203412527 U | 1/2014 |

(Continued)

*Primary Examiner* — Jacob B Meyer  
(74) *Attorney, Agent, or Firm* — Foley & Lardner LLP (57) ABSTRACT

A fire apparatus includes a chassis, a cab coupled to the chassis, a pump system coupled to the chassis and positioned at least partially behind the cab, and a driveline. The pump system includes a pump. The driveline includes a prime mover positioned beneath the cab and coupled to the chassis, a transmission, and a sandwiched power take-off unit positioned between (a) the prime mover and (b) the transmission and the pump system. The sandwiched power take-off unit facilitates operating the pump independent of a gear selection of the transmission and a ground speed of the fire apparatus.

17 Claims, 10 Drawing Sheets

(56) References Cited

U.S. PATENT DOCUMENTS

| | | | |
|---|---|---|---|
| 7,784,554 B2 * | 8/2010 | Grady | A62C 27/00 |
| | | | 169/62 |
| 8,376,719 B2 * | 2/2013 | Grady | F04D 29/4293 |
| | | | 417/364 |
| 9,145,053 B2 | 9/2015 | Mettler et al. | |
| 9,580,962 B2 * | 2/2017 | Betz | A62C 27/00 |
| 9,649,519 B2 * | 5/2017 | Lozier | A01M 7/0075 |
| 10,435,026 B2 * | 10/2019 | Shively | B60K 25/06 |
| 2002/0098748 A1 | 7/2002 | Roycroft | |
| 2004/0002794 A1 | 1/2004 | Pillar et al. | |
| 2004/0199302 A1 | 10/2004 | Pillar et al. | |
| 2005/0234622 A1 | 10/2005 | Pillar et al. | |
| 2006/0022001 A1 | 2/2006 | Linsmeier et al. | |
| 2006/0032701 A1 | 2/2006 | Linsmeier et al. | |
| 2006/0032702 A1 | 2/2006 | Linsmeier et al. | |
| 2006/0065411 A1 | 3/2006 | Linsmeier et al. | |
| 2006/0086566 A1 | 4/2006 | Linsmeier et al. | |
| 2008/0114513 A1 | 5/2008 | Pillar et al. | |
| 2009/0033044 A1 | 2/2009 | Linsmeier | |
| 2009/0095545 A1 | 4/2009 | Crabtree et al. | |
| 2014/0262355 A1 | 9/2014 | Linsmeier | |
| 2018/0215354 A1 | 8/2018 | Linsmeier et al. | |
| 2018/0215597 A1 | 8/2018 | Linsmeier et al. | |
| 2018/0222484 A1 | 8/2018 | Shively et al. | |
| 2018/0289999 A1 | 10/2018 | Kay et al. | |
| 2018/0293818 A1 | 10/2018 | Linsmeier et al. | |
| 2018/0297597 A1 | 10/2018 | Linsmeier et al. | |
| 2019/0015692 A1 | 1/2019 | Fieber et al. | |
| 2019/0262646 A1 | 8/2019 | Linsmeier et al. | |
| 2019/0263408 A1 | 8/2019 | Linsmeier et al. | |
| 2019/0359184 A1 | 11/2019 | Linsmeier et al. | |
| 2019/0359460 A1 | 11/2019 | Linsmeier et al. | |
| 2020/0108285 A1 | 4/2020 | Kay et al. | |
| 2020/0238115 A1 | 7/2020 | Linsmeier et al. | |
| 2020/0279444 A1 | 9/2020 | Linsmeier et al. | |
| 2021/0107361 A1 | 4/2021 | Linsmeier et al. | |
| 2021/0253102 A1 | 8/2021 | Linsmeier et al. | |
| 2021/0339065 A1 | 11/2021 | Linsmeier et al. | |
| 2022/0009761 A1 | 1/2022 | Archer et al. | |
| 2022/0024425 A1 | 1/2022 | Linsmeier et al. | |
| 2022/0072354 A1 | 3/2022 | Fieber et al. | |
| 2022/0074417 A1 | 3/2022 | Linsmeier et al. | |
| 2022/0080944 A1 | 3/2022 | Linsmeier et al. | |
| 2022/0097527 A1 | 3/2022 | Koga et al. | |
| 2022/0097961 A1 | 3/2022 | Koga et al. | |
| 2022/0097964 A1 | 3/2022 | Koga et al. | |
| 2022/0112061 A1 | 4/2022 | Archer et al. | |
| 2022/0185582 A1 | 6/2022 | Koga et al. | |
| 2022/0193473 A1 | 6/2022 | Kay et al. | |
| 2022/0309844 A1 | 9/2022 | Linsmeier et al. | |
| 2022/0355140 A1 | 11/2022 | Linsmeier et al. | |
| 2022/0355141 A1 | 11/2022 | Linsmeier et al. | |
| 2022/0355142 A1 | 11/2022 | Linsmeier et al. | |
| 2022/0355690 A1 | 11/2022 | Linsmeier et al. | |
| 2022/0379892 A1 | 12/2022 | Archer et al. | |
| 2023/0149754 A1 * | 5/2023 | Linsmeier | B60K 25/02 |
| | | | 169/24 |
| 2023/0241968 A1 * | 8/2023 | Linsmeier | F16D 65/28 |
| | | | 180/53.1 |
| 2024/0035254 A1 | 2/2024 | Linsmeier et al. | |
| 2024/0149086 A1 | 5/2024 | Linsmeier | |
| 2024/0149087 A1 | 5/2024 | Archer et al. | |
| 2024/0149088 A1 | 5/2024 | Archer et al. | |
| 2024/0149089 A1 * | 5/2024 | Archer | A62C 27/00 |
| 2024/0149658 A1 | 5/2024 | Archer et al. | |
| 2024/0149659 A1 | 5/2024 | Archer et al. | |
| 2024/0149708 A1 | 5/2024 | Archer et al. | |
| 2024/0149709 A1 * | 5/2024 | Archer | B60R 16/0207 |
| 2024/0149710 A1 | 5/2024 | Newlin et al. | |
| 2024/0149711 A1 | 5/2024 | Archer et al. | |
| 2024/0149815 A1 | 5/2024 | Archer et al. | |
| 2024/0149864 A1 | 5/2024 | Linsmeier | |
| 2024/0149948 A1 | 5/2024 | Archer et al. | |
| 2024/0149965 A1 * | 5/2024 | Archer | B60W 20/40 |

FOREIGN PATENT DOCUMENTS

| | | | |
|---|---|---|---|
| CN | 203715464 U | 7/2014 | |
| CN | 204023465 U | 12/2014 | |
| CN | 205108842 U | 3/2016 | |
| CN | 205445580 U | 8/2016 | |
| CN | 207772980 U | 8/2018 | |
| CN | 111350459 A | 6/2020 | |
| CN | 113511286 A | 10/2021 | |
| CN | 215663727 U | 1/2022 | |
| CN | 115520009 A | 12/2022 | |
| JP | 11-189172 A | 7/1999 | |
| JP | 2002-017124 A | 1/2002 | |
| JP | 2002-019410 A | 1/2002 | |
| JP | 7192650 B2 | 12/2022 | |
| KR | 200404455 Y1 * | 12/2005 | |
| KR | 102448686 B1 | 9/2022 | |
| WO | WO-2007/108805 A1 | 9/2007 | |
| WO | WO-2007140179 A2 * | 12/2007 | A62C 27/00 |

* cited by examiner

SANDWICHED POWER TAKE-OFF (PTO) FOR A VEHICLE

CROSS-REFERENCE TO RELATED PATENT APPLICATIONS

This application claims the benefit of and priority to (a) U.S. Provisional Patent Application No. 63/279,944, filed Nov. 16, 2021 and (b) U.S. Provisional Patent Application No. 63/335,681, filed Apr. 27, 2022, both of which are incorporated herein by reference in their entireties.

BACKGROUND

A fire apparatus can include an on-board pump system that pumps a fluid (e.g., water) from a water source (e.g., a water tank, a fire hydrant, etc.) to one or more outputs of the fire apparatus. Such pump systems are typically driven using an engine PTO or are positioned downstream of transmission.

SUMMARY

One embodiment relates to a fire apparatus. The fire apparatus includes a chassis, a cab coupled to the chassis, a pump system coupled to the chassis and positioned at least partially behind the cab, and a driveline. The pump system includes a pump. The driveline includes a prime mover positioned beneath the cab and coupled to the chassis, a transmission, and a sandwiched power take-off unit positioned between (a) the prime mover and (b) the transmission and the pump system. The sandwiched power take-off unit facilitates operating the pump independent of a gear selection of the transmission and a ground speed of the fire apparatus.

Another embodiment relates to a vehicle. The vehicle includes a vehicle accessory and a driveline. The driveline includes a prime mover, a transmission, and a sandwiched power take-off unit positioned between (a) the prime mover and (b) the transmission and the vehicle accessory. The sandwiched power take-off unit includes a main housing defining an aperture and an interior chamber, a main drive shaft disposed within the interior chamber, a power take-off drive shaft positioned external to the main housing, a gear train, and a clutch. The main drive shaft is driven by the prime mover. The power take-off drive shaft is coupled to the vehicle accessory. The gear train extends from the main drive shaft, through the aperture in the main housing, and to the power take-off drive shaft. The gear train includes a drive gear coupled to the main drive shaft, an output gear coupled to the power take-off drive shaft, and an intermediate gear positioned between the drive gear and the output gear. The clutch is positioned to facilitate selectively disconnecting the vehicle accessory from the main drive shaft.

Still another embodiment relates to a vehicle. The vehicle includes a vehicle accessory and a driveline. The driveline includes a prime mover, a transmission, and a sandwiched power take-off unit positioned between (a) the prime mover and (b) the transmission and the vehicle accessory. The sandwiched power take-off unit includes a main housing, a main drive shaft, a power take-off drive shaft, a gear train, an adapter plate, a first bearing, a second bearing, an auxiliary shaft, and a clutch. The main housing defines an interior chamber and has a support extending through the interior chamber. The main drive shaft is disposed within the interior chamber and extends through the support. The power take-off drive shaft is coupled to the vehicle accessory. The gear train includes a drive gear coupled to the main drive shaft, an output gear coupled to the power take-off drive shaft, and an intermediate gear positioned between the drive gear and the output gear. The adapter plate is coupled to an output of the prime mover. The adapter plate defines a central bore that receives an end of the main drive shaft without a bearing positioned therebetween. The first bearing is positioned between the main drive shaft and the drive gear. The second bearing is positioned between the main drive shaft and the support. The auxiliary shaft is received by the support. The intermediate gear is disposed on the auxiliary shaft. The clutch is positioned to facilitate selectively disconnecting the vehicle accessory from the main drive shaft.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
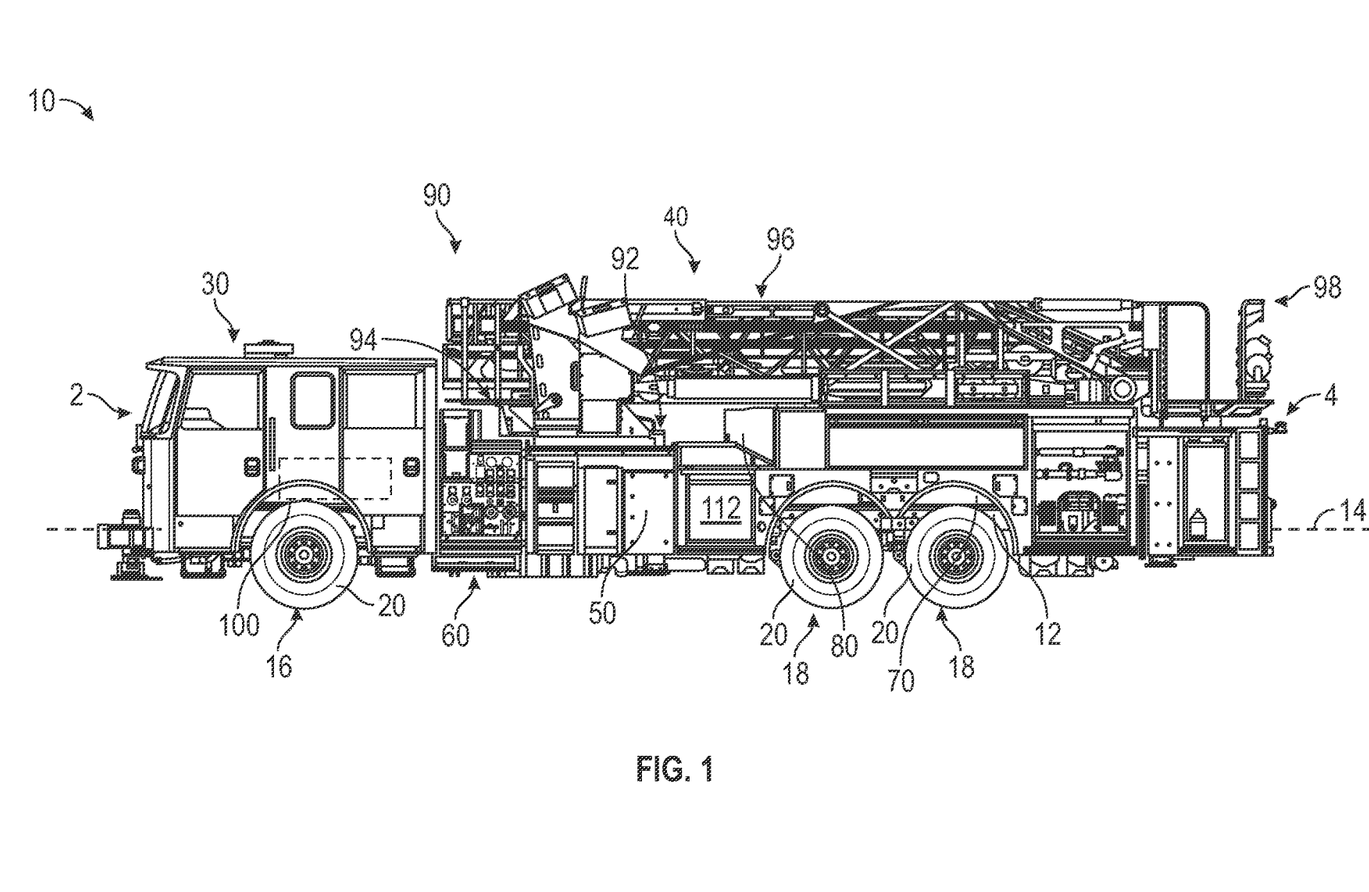
FIG. 1 is a side view of a vehicle, according to an exemplary embodiment.

According to the exemplary embodiment shown in FIG. 1, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. According to the exemplary embodiment shown in FIG. 2, the fire apparatus 10 is configured as a rear-mount, quint, single rear axle fire truck. In yet other embodiments, the fire apparatus 10 is configured as a rear-mount, quint or non-quint, single rear axle or tandem rear axle fire truck. In yet other embodiments, the fire apparatus does not include an aerial ladder (e.g., a pumper, a fire engine, etc.). In still other embodiments, the vehicle is not a fire truck, but is any other type of vehicle (e.g., a concrete mixer truck, a refuse truck, etc.) that can include a sandwiched PTO unit similar to the fire apparatus 10, as described in greater detail herein.

Figure 2:
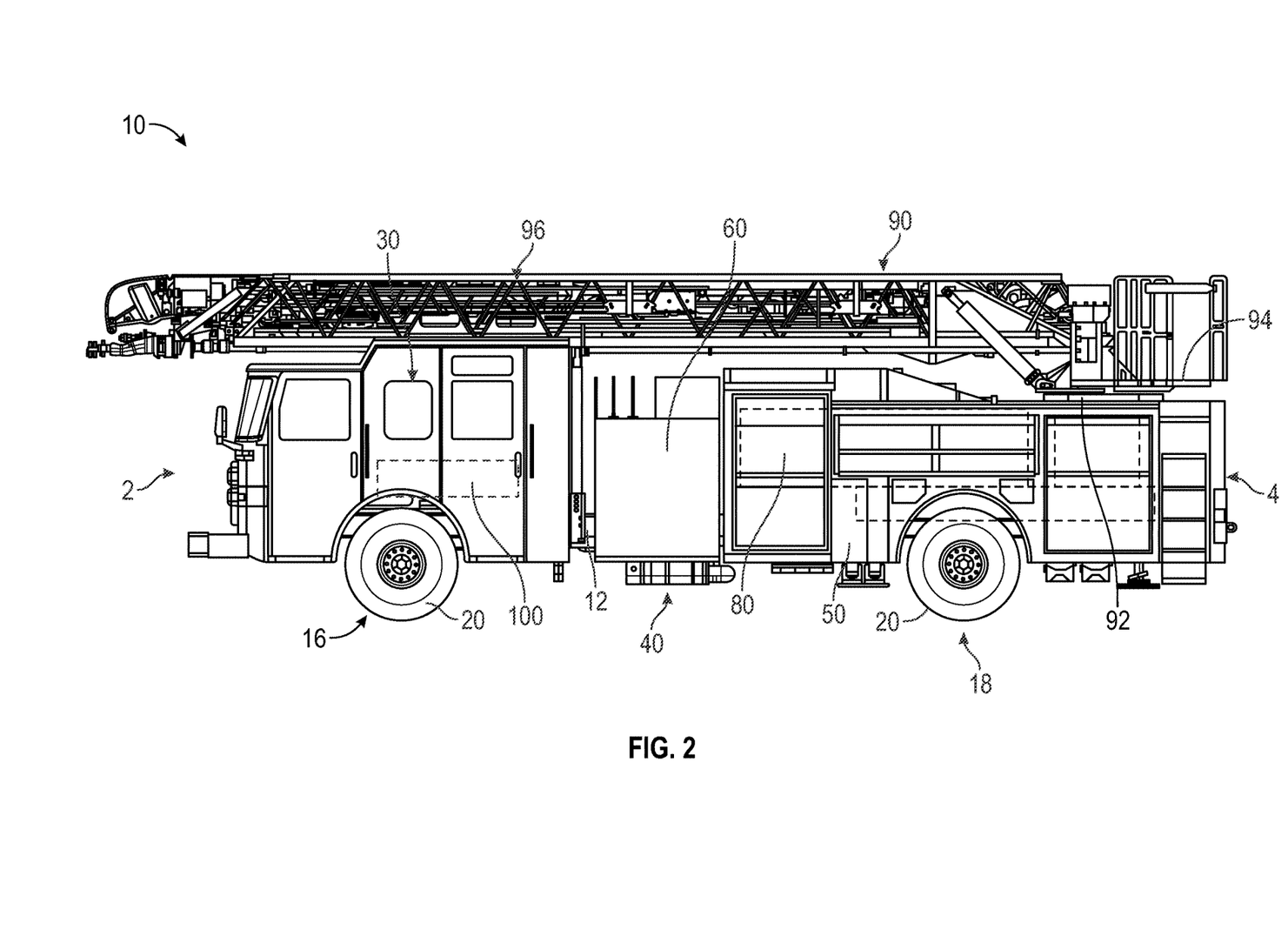
FIG. 2 is a side view of a vehicle, according to another exemplary embodiment.

As shown in FIGS. 1 and 2, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly or cab assembly, shown as front cabin 30, coupled to and supported by the frame 12; a second assembly, shown as rear assembly 40, coupled to and supported by the frame 12; and a powertrain, shown as driveline 100, coupled to and supported by the frame 12.

As shown in FIGS. 1 and 2, the front axle 16 and the rear axles 18 include tractive assemblies, shown as wheel and tire assemblies 20. As shown in FIGS. 1 and 2, the front cabin 30 is positioned forward of the rear assembly 40 (e.g., with respect to a forward direction of travel for the fire apparatus 10 along the longitudinal axis 14, etc.). According to an alternative embodiment, at least a portion of the cab assembly may be positioned behind the rear assembly 40 (e.g., with respect to a forward direction of travel for the fire apparatus 10 along the longitudinal axis 14, etc.). The cab assembly may be positioned behind the rear assembly 40 on, by way of example, a rear tiller fire apparatus. In some embodiments, the fire apparatus 10 is a ladder truck with a front portion that includes the front cabin 30 pivotally coupled to a rear portion that includes the rear assembly 40 (i.e., the rear portion is towed by the front portion).

As shown in FIGS. 1 and 2, the rear assembly 40 includes a body assembly, shown as body 50, coupled to and supported by the frame 12; a fluid driver, shown as pump system 60, coupled to and supported by the frame 12; a chassis support member, shown as torque box 70, coupled to and supported by the frame 12; a fluid reservoir, shown as water tank 80, coupled to the body 50 and supported by the torque box 70 and/or the frame 12; and an aerial assembly, shown as aerial assembly 90, pivotally coupled to the torque box 70 and supported by the torque box 70 and/or the frame 12. In some embodiments, the rear assembly 40 additionally or alternatively includes an agent or foam tank (e.g., that receives and stores a fire suppressing agent, foam, etc.). In some embodiments, the rear assembly 40 does not include the torque box 70, the water tank 80, and/or the aerial assembly 90.

According to an exemplary embodiment, the pump system 60 includes a housing that supports a pump that is configured to drive fluid (e.g., water, agent, etc.) from a fluid source (e.g., the water tank 80, the agent tank, an external source such as a fire hydrant, etc.) to one or more fluid outlets of the fire apparatus 10 (e.g., a structural hose outlet along the body 50; a deluge gun, cannon, or turret; a hose reel; etc.). According to an exemplary embodiment, the pump system 60 is a midship mounted pump system that (i) is located at or proximate the middle of the fire apparatus 10 (e.g., between the front axle 16 and the rear axle(s) 18) and (ii) is part of the driveline 100 of the fire apparatus 10.

Figure 9:
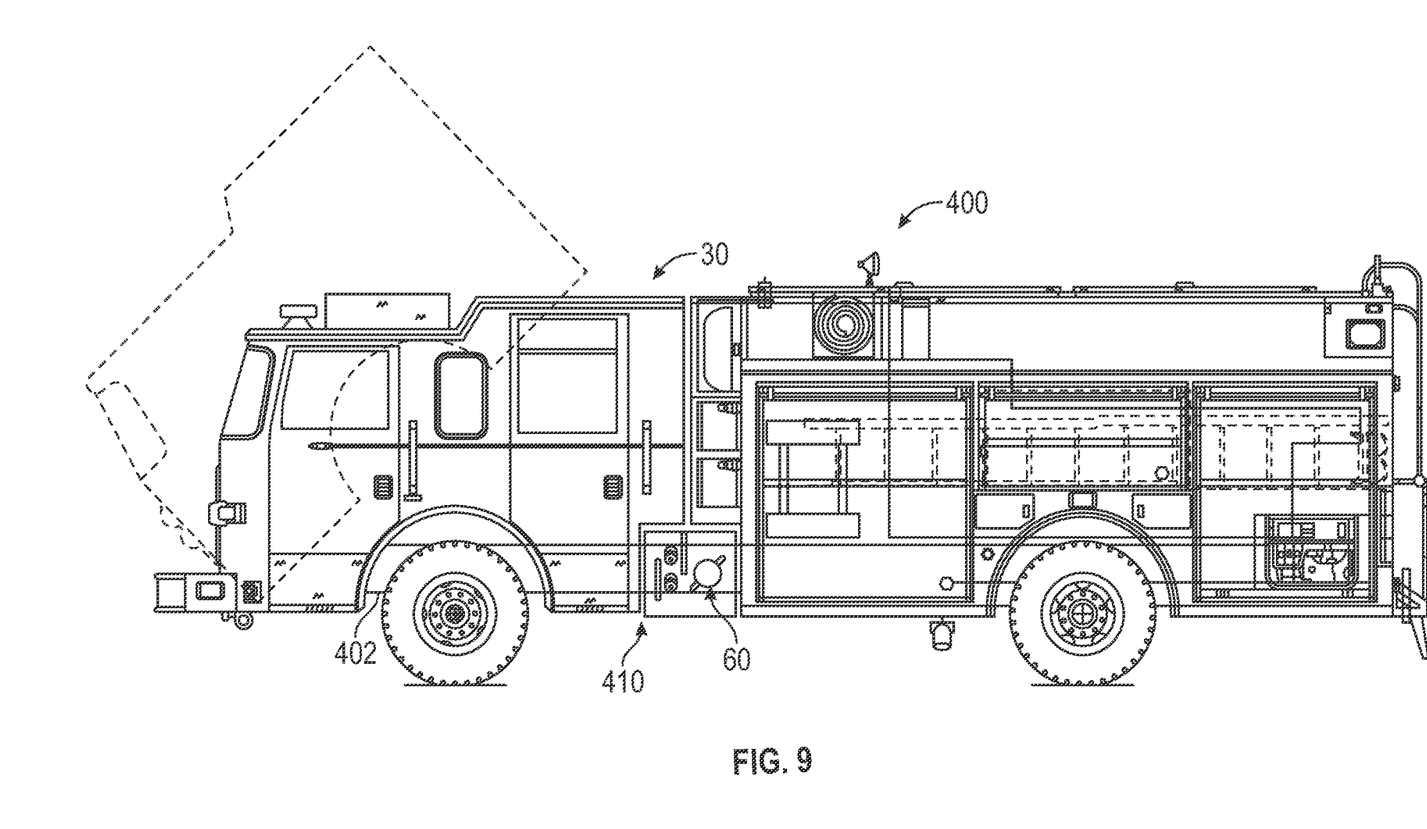
FIGS. 9-11 are side views of a vehicle, according to another exemplary embodiment.
Figure 10:
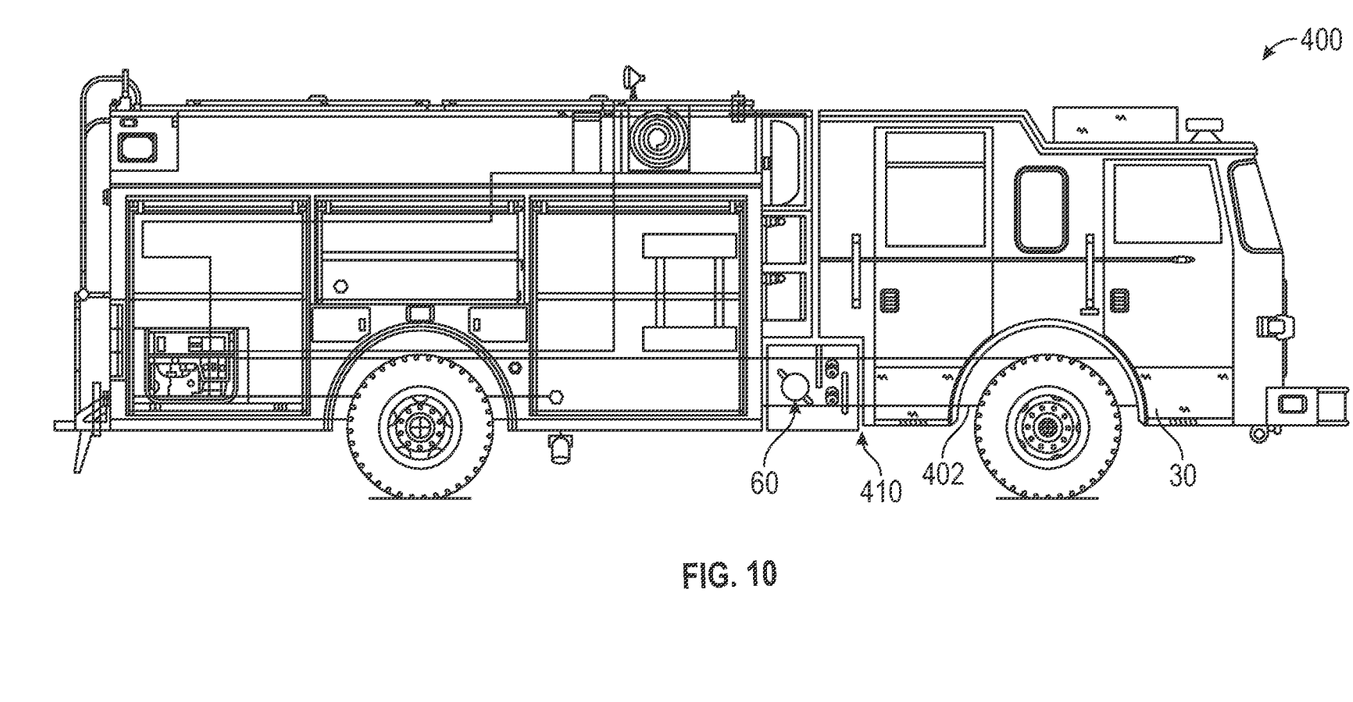
Figure 11:
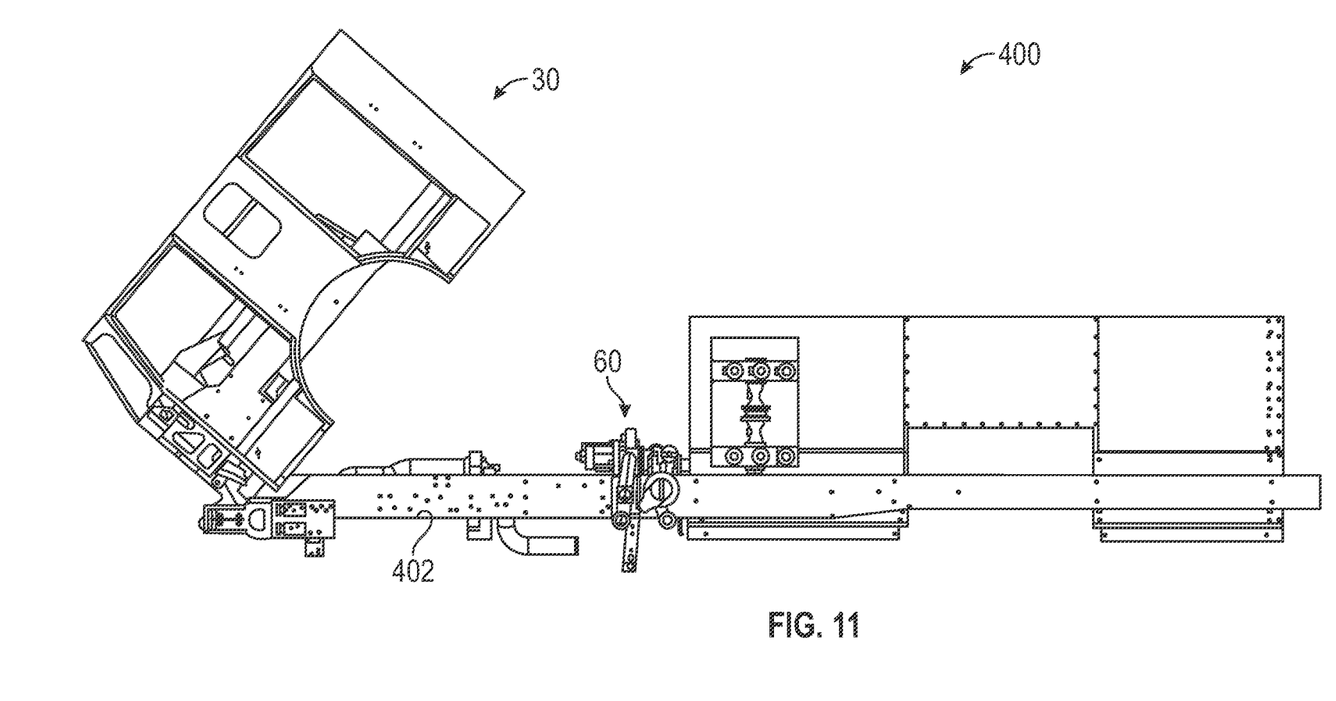

A fire apparatus 400 is shown in FIGS. 9-11 according to an alternative embodiment. The fire apparatus 400 may be substantially similar to the fire apparatus 10, except as otherwise specified herein. In the fire apparatus 400, the pump system 60 is positioned at least partially beneath or below the front cabin 30 (e.g., partially beneath the cabin, entirely beneath the front cabin). In some embodiments, a footprint of the front cabin 30 partially encompasses or contains the pump system 60 (e.g., such that a portion of the pump system 60 extends beyond the footprint of the front cabin 30). In other embodiments, the footprint of the front cabin 30 entirely or completely encompasses or contains the pump system 60. Accordingly, the front cabin 30 may be supported above or otherwise disposed over at least a portion of the pump system 60.

In some embodiments, the pump system 60 may be at least partially supported within a cavity (e.g., along a centerline of fire apparatus 400, etc.) defined by the longitudinal frame rails 402 of the fire apparatus 400. The pump system 60 may at least partially extend above the frame rails 402. The front cabin 30 may be configured to accommodate the positioning of the pump system 60 at least partially above the frame rails 402. For example, a bottom portion of the front cabin 30 may include a raised portion or raised floor that protrudes into the occupant compartment and defines an area (e.g., cavity, chamber, tunnel, etc.) configured to receive at least a portion of the pump system 60. This may include a portion extending in longitudinally along a centerline of the front cabin 30 (e.g., a tunnel, shroud, doghouse, etc.) and/or a portion or raised floor extending laterally along a rear portion of the front cabin 30 (e.g., a rear seat box, EMS compartment, storage receptacle, etc.).

The pump system 60 may be positioned such that a main portion of the pump system 60 (e.g., a fire pump and a gear case, etc.) is positioned under the rear portion of front cabin 30. To facilitate the positioning of pump system 60 under the front cabin 30, a rear wall of the front cabin 30 may include a central cutout portion that extends upward from a bottom edge and is sized to conform to or otherwise receive a portion of the pump system 60 (e.g., a pump housing, etc.). To further accommodate the positioning of pump system 60, the left and right sides of the front cabin 30 may define a cutout portion 410 at their respective bottom rear corners. The cutout portion 410 is provided to permit a portion of a fluid routing system of the pump system 60 to be supported under the front cabin 30.

In some embodiments, the front cabin 30 is movably (e.g., tiltably, slidably, removably, etc.) coupled to the frame 12. The front cabin 30 may be selectively repositionable between a first or transit position (shown in solid lines in FIG. 9) and a second or service position (shown in dashed lines in FIG. 9). The front cabin 30 may be repositionable using one or more actuators (e.g., hydraulic cylinders, electric linear actuators, etc.). In the service position, systems positioned beneath the front cabin 30 (e.g., the pump system 60, etc.) are more accessible from above the frame 12 than would otherwise be if the front cabin 30 was in the transit position. Movably supporting the front cabin 30 relative to the frame 12 facilitates relatively unrestricted or otherwise convenient access to systems (e.g., the pump system 60, etc.) that may be supported at least partially under the front cabin 30.

As shown in FIGS. 1 and 2, the aerial assembly 90 includes a turntable assembly, shown as turntable 92, pivotally coupled to the torque box 70; a platform, shown work platform 94, coupled to the turntable 92; a ladder assembly, shown as aerial ladder assembly 96, having a first end (e.g., a base end, a proximal end, a pivot end, a platform end, etc.) pivotally coupled to the turntable 92, and an opposing second end (e.g., a free end, a distal end, an implement end, etc.); and an implement, shown as work basket 98, coupled to the opposing second end of the aerial ladder assembly 96. In some embodiments, as shown in FIG. 2, the aerial assembly 90 does not include the work basket 98. In some embodiments, the work basket 98 is replaced with or additionally includes a nozzle (e.g., a deluge gun, a water cannon, a water turret, etc.) or other tool/implement. By way of example, the nozzle may be connected to a water source (e.g., the water tank 80, an external source, a fire hydrant, etc.) with a conduit extending along the aerial ladder assembly 96 (e.g., along the side of the aerial ladder assembly 96, beneath the aerial ladder assembly 96, in a channel provided in the aerial ladder assembly 96, etc.). By pivoting the aerial ladder assembly 96 into a raised position, the nozzle may be elevated to expel water from a higher elevation to facilitate suppressing a fire. According to an exemplary embodiment, the aerial assembly 90 (e.g., the turntable 92, the work platform 94, the aerial ladder assembly 96, the work basket 98, etc.) is controllable (e.g., rotatable, pivotable, extendable, etc.) such that the aerial assembly 90 is selectively repositionable into a plurality of operating positions or orientations.

Driveline

According to an exemplary embodiment, the driveline 100 is configured to (i) propel the fire apparatus 10 and (ii) drive the pump system 60. As shown in FIGS. 3-5, 7, and 8, the driveline 100 includes a primary driver, shown as prime mover 110, and an energy storage device, shown as energy storage 120. In some embodiments, the driveline 100 is a conventional driveline whereby the prime mover 110 is an internal combustion engine and the energy storage 120 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 100 is an electric driveline whereby the prime mover 110 is an electric motor and the energy storage 120 is a battery system. In some embodiments, the driveline 100 is a fuel cell electric driveline whereby the prime mover 110 is an electric motor and the energy storage 120 is a fuel cell (e.g., that stores hydrogen, that produces electricity from the hydrogen, etc.). In some embodiments, the driveline 100 is a hybrid driveline whereby (i) the prime mover 110 includes an internal combustion engine and an electric motor/generator and (ii) the energy storage 120 includes a fuel tank and/or a battery system.

As shown in FIGS. 3-5, 7, and 8, the driveline 100 includes a transmission device (e.g., a gearbox, a continuous variable transmission ("CVT"), etc.), shown as transmission 130, and a first power divider, shown as sandwiched PTO unit 200, positioned between (i.e., sandwiched between) the prime mover 110 and the transmission 130, and coupled to the pump system 60. According to an exemplary embodiment, the prime mover 110 is positioned beneath the front cabin 30 and, therefore, the sandwiched PTO unit 200 is at least partially positioned beneath the front cabin 30. According to an exemplary embodiment, the sandwiched PTO unit 200 is configured to receive an input from the prime mover 110 and provide (i) a first output to the transmission 130 to drive the fire apparatus 10 and (ii) a second output to the pump system 60 to drive a pump thereof. In other embodiments (e.g., non-fire apparatus implementations, etc.), the second output of the sandwiched PTO unit 200 is provided to another type of vehicle system or vehicle accessory (e.g., an accessory drive, a compressor, etc.) other than the pump system 60. According to an exemplary embodiment, the transmission 130 has a variety of configurations (e.g., gear ratios, etc.) and provides different output speeds relative to an input received thereby from the sandwiched PTO unit 200.

Figure 3:
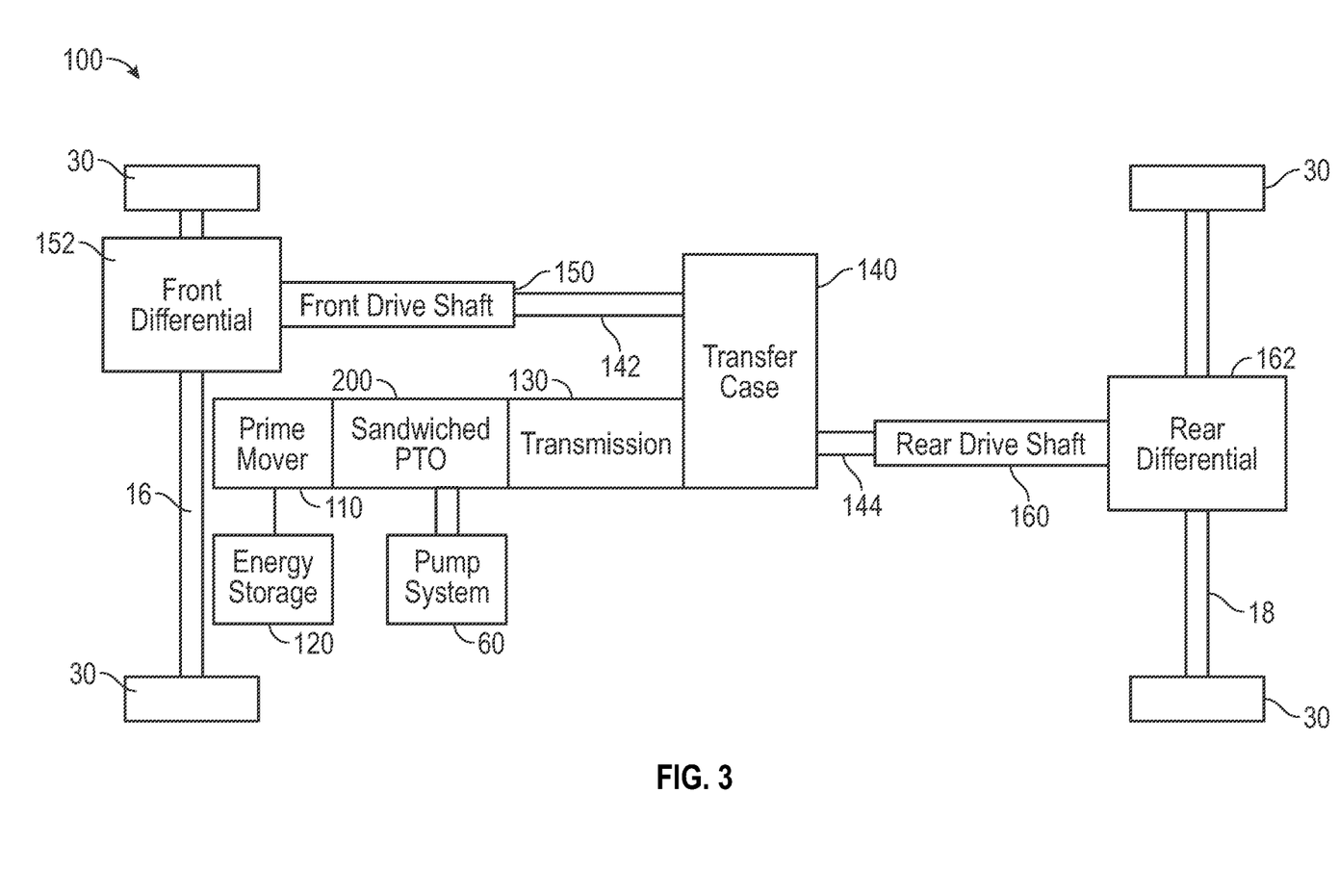
FIG. 3 is a schematic drawing of a driveline of the vehicle, according to an exemplary embodiment.
Figure 4:
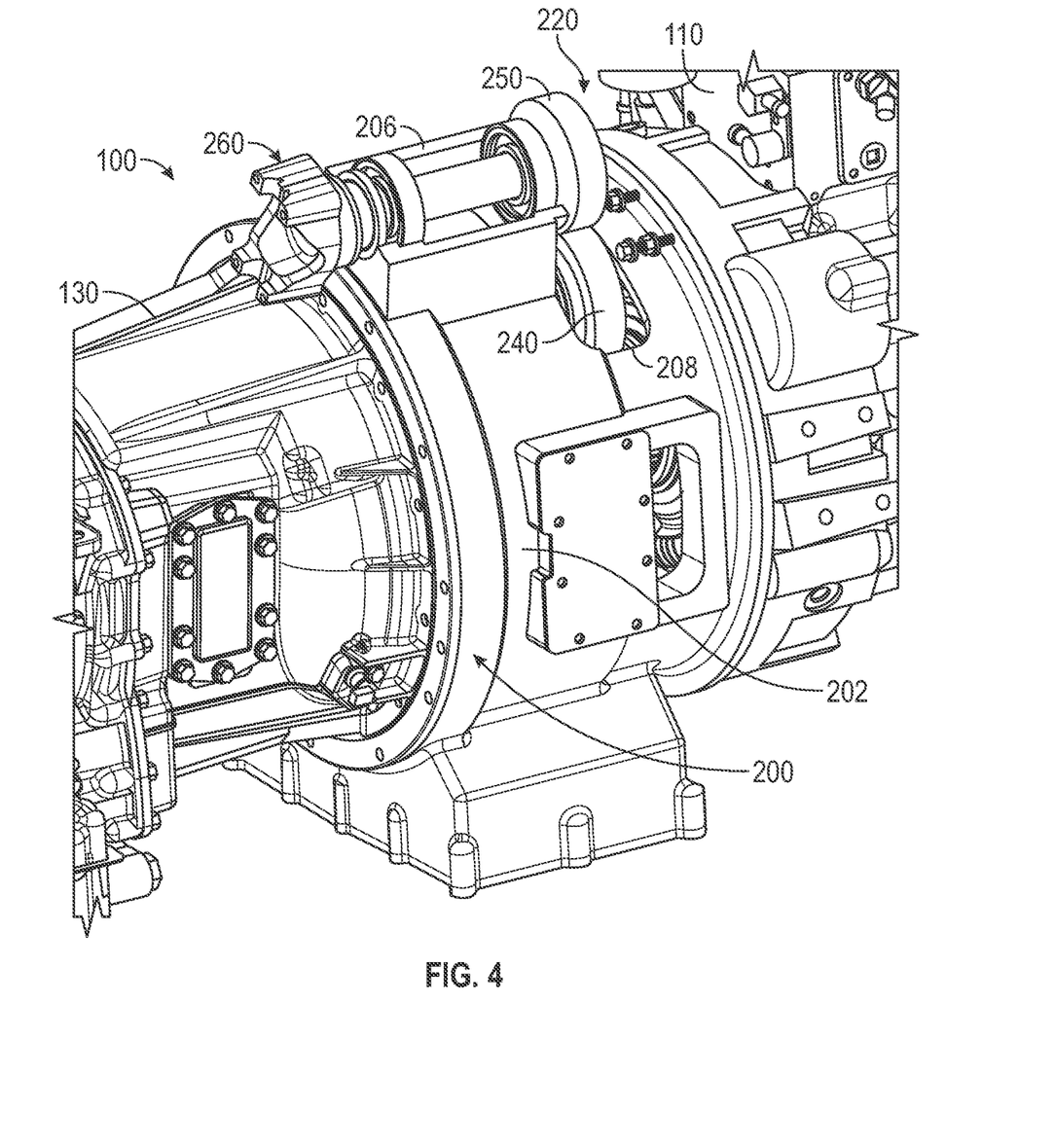
FIG. 4 is a perspective view of a portion of the driveline of FIG. 3 including a prime mover, a transmission, and a power divider positioned between the prime mover and the transmission, according to an exemplary embodiment.

As shown in FIG. 3, the driveline 100 additionally includes a second power divider, shown as transfer case 140, coupled to the transmission 130; a first drive shaft, shown as front drive shaft 150, coupled to a first or front output 142 of the transfer case 140; a first differential, shown as front differential 152, coupled to the front drive shaft 150 and the front axle 16; a second drive shaft, shown as rear drive shaft 160, coupled to a second or rear output 144 of the transfer case 140; and a second differential, shown as rear differential 162, coupled to the rear drive shaft 160 and the rear axle(s) 18. According to an exemplary embodiment, the transfer case 140 is configured to facilitate driving both the front axle 16 and the rear axle(s) 18 with the prime mover 110 to facilitate front and rear drive (e.g., an all-wheel-drive vehicle, a four-wheel-drive vehicle, etc.). In some embodiments, the transfer case 140 facilitates selectively engaging rear drive only, front drive only, and both front and rear drive simultaneously. In some embodiments, the transmission 130 and/or the transfer case 140 facilitate selectively disengaging the front axle 16 and the rear axle(s) 18 from the prime mover 110 (e.g., in a neutral mode of operation). In some embodiments (e.g., in electric driveline configurations, in hybrid driveline configurations, etc.), the driveline 100 does not include the transmission 130. In such embodiments, the sandwiched PTO unit 200 may be directly coupled to the transfer case 140. In some embodiments, the driveline 100 does not include the transfer case 140. In such embodiments, the transmission 130 may directly drive the front drive shaft 150 (i.e., a front-wheel-drive vehicle) or the rear drive shaft 160 (i.e., a rear-wheel-drive vehicle). In some embodiments, the driveline 100 does not include the front drive shaft 150 or the front differential 152 (e.g., a rear-wheel-drive vehicle). In some embodiments, the driveline 100 does not include the rear drive shaft 160 or the rear differential 162 (e.g., a front-wheel-drive vehicle).

Sandwiched PTO Unit

Traditionally, water pumps on fire apparatuses have been driven using a rear engine power take-off ("REPTO") or water pumps have been positioned along the driveline downstream of the transmission. However, REPTOs are limited in torque and horsepower output. Also, an arrangement with the water pump positioned downstream of the transmission requires a gear box or pump transfer case to be able to shift between a pump mode and a drive mode, which can complicate the driveline because of the addition of components and cause potential vibrations due to unfavorable layouts driven by packaging and driveline length constraints. Also, such arrangements can extend the length of the driveline.

According to an exemplary embodiment, the sandwiched PTO unit 200 reduces overall pump driveline components and simplifies the driveline by removing a pump transfer case and making the driveline angles more manageable. The sandwiched PTO unit 200 may also permit shortening the overall length of the driveline 100 relative to prior drivelines, allowing for shorter vehicle lengths. According to an exemplary embodiment, the sandwiched PTO unit 200 facilitates operating the pump of the pump system 60 independent of a gear selection of the transmission 130 and a ground speed of the fire apparatus 10, while operating at a higher torque and horsepower output. By way of example, the sandwiched PTO unit 200 may accommodate driving or being configured to drive more than a 1500 gallon-per-minute ("gpm") pump (e.g., greater than a 1,500 gpm pump; up to a 2,000 gpm pump; at least a 2,000 gpm pump, greater than an 2,000 gpm pump; etc.), while traditional pump drive designs can max out at 1,500 gpm pumps or less. In addition, the sandwiched PTO unit 200 accommodates engines or primary drivers that have either a clockwise or counterclockwise output.

As shown in FIGS. 4-8, the sandwiched PTO unit 200 includes a first housing, shown as main housing 202, defining an interior chamber, shown as main chamber 204; a second housing, shown as pump output housing 206, extending from the main housing 202; a first PTO drive shaft, shown as main drive shaft 210, disposed within and extending through the main chamber 204; a pump output or second PTO drive shaft, shown as pump drive shaft 260, at least partially disposed within, supported by, and extending from the pump output housing 206; and a gear train, shown as pump gear train 220, including a plurality of gears that couple the main drive shaft 210 to the pump drive shaft 260 by coupling to the main drive shaft 210, extending through an opening, shown as gear aperture 208, defined by the main housing 202, and coupling to the pump drive shaft 260.

Figure 5:
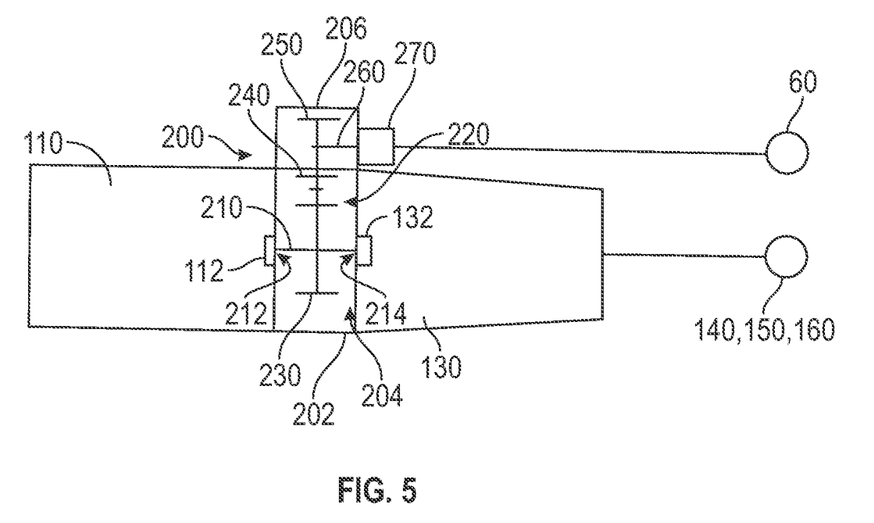
FIGS. 5 and 6 are various schematic drawings of the portion of the driveline of FIG. 4, according to an exemplary embodiment.
Figure 6:
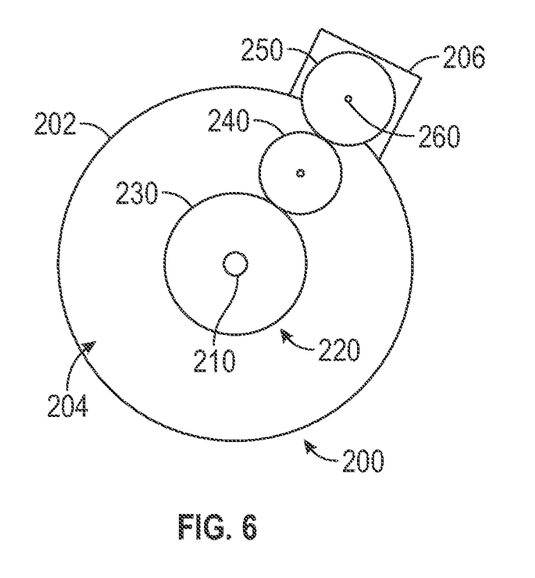
Figure 7:
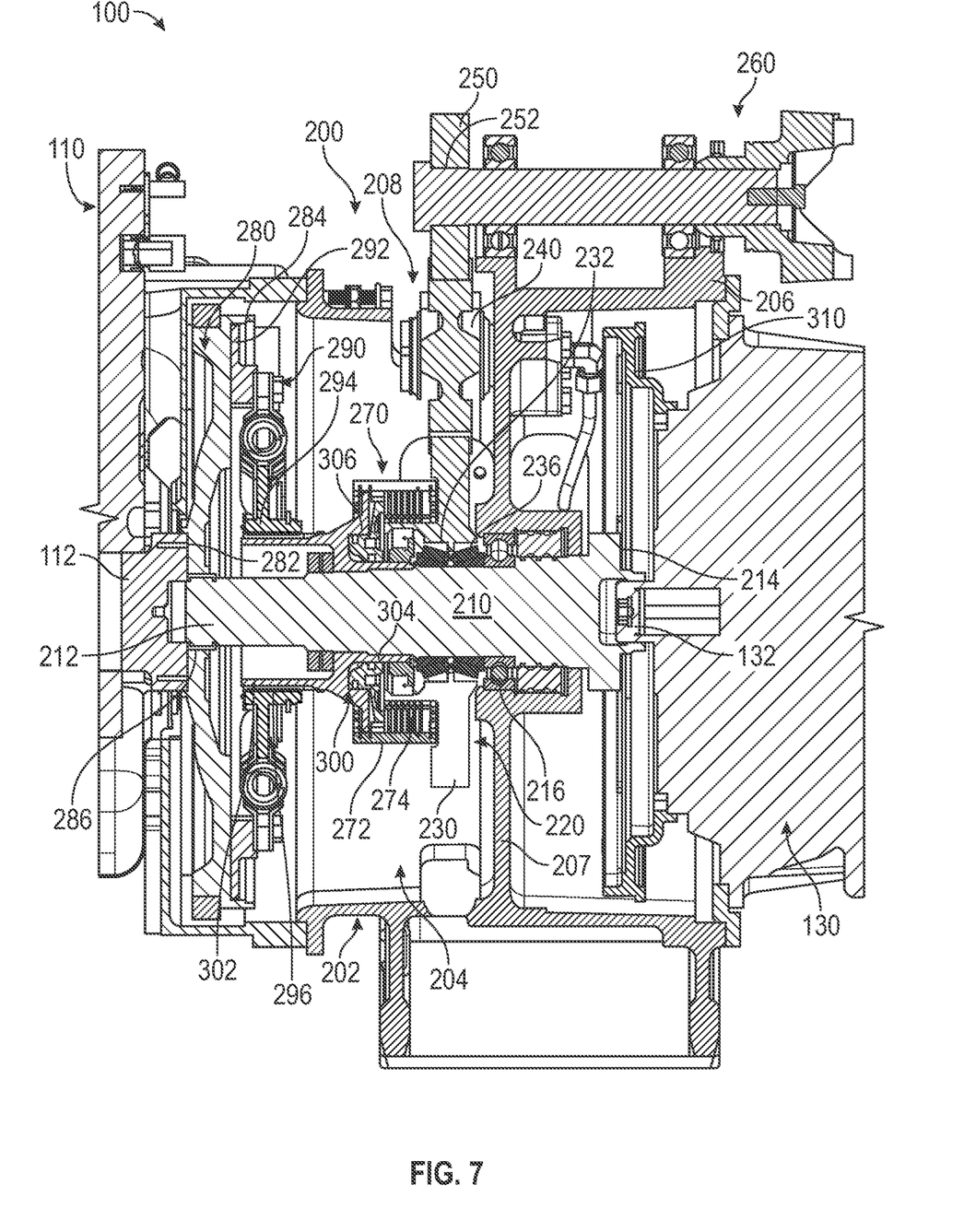
FIG. 7 is a first cross-sectional view of the portion of the driveline of FIG. 4, according to another exemplary embodiment.

As shown in FIGS. 4-8, the plurality of gears of the pump gear train 220 include a first gear, shown as drive gear 230, coupled to (e.g., disposed along) the main drive shaft 210; a second or intermediate gear, shown as idler gear 240, coupled to the drive gear 230 (e.g., in a meshing engagement); and a third or final gear, shown as output gear 250, coupled to the idler gear 240 (e.g., in a meshing engagement) and the pump drive shaft 260 (e.g., disposed along the pump drive shaft 260). In other embodiments, the pump gear train 220 includes a different number of gears (e.g., two gears, four gears, etc.). As shown in FIGS. 5 and 7, the main drive shaft 210 includes a first end, shown as input end 212, coupled to an output (e.g., a crankshaft, etc.), shown as prime mover output 112, of the prime mover 110 and an opposing second end, shown as output end 214, coupled to an input, shown as transmission input 132, of the transmission 130. Accordingly, driving the main drive shaft 210 with the prime mover 110 facilitates driving (i) the transmission 130 and, thereby, the fire apparatus 10 (e.g., the transfer case 140, the front drive shaft 150, the front axle 16, the rear drive shaft 160, the rear axle(s) 18, etc.) and (ii) the pump gear train 220 and, thereby, the pump drive shaft 260 and the pump of the pump system 60.

According to the exemplary embodiments shown in FIGS. 5 and 7, the sandwiched PTO unit 200 includes a clutch, shown as pump clutch 270, that provides a clutched pump output design. Such clutched pump output designs reduce noise pollution and reduce wear on the pump driveline components (e.g., bearings, gears, chains, etc.) by completely disengaging the pump system 60 from the prime mover 110 when the pump is not in use.

As shown in FIG. 5, the clutched pump output design is an external clutch design where the pump clutch 270 is positioned between the pump drive shaft 260 of the sandwiched PTO unit 200 and the pump of the pump system 60 (e.g., the pump clutch 270 is positioned outside of the main housing 202 of the sandwiched PTO unit 200, the pump clutch 270 is positioned downstream of the pump gear train 220, etc.). Accordingly, the pump clutch 270 in the external clutch design can be disengaged when the pump is not in use to decouple the pump drive shaft 260 from the pump system 60 so that the pump system 60 is not unnecessarily driven by the sandwiched PTO unit 200 when the pump is not in use.

As shown in FIG. 7, the clutched pump output design is an internal clutch design where the pump clutch 270 is positioned (i) within the main chamber 204 of the main housing 202 of the sandwiched PTO unit 200 and (ii) upstream of the pump drive shaft 260 and the pump gear train 220 (e.g., between the main drive shaft 210 and the pump gear train 220). Accordingly, the pump clutch 270 in the internal clutch design can be disengaged when the pump is not in use to decouple the pump gear train 220, the pump drive shaft 260, and the pump system 60 from the main drive shaft 210 such that (i) the pump system 60 and (ii) the pump gear train 220 and the pump drive shaft 260 of the sandwiched PTO unit 200 are not unnecessarily driven when the pump is not in use.

As shown in FIG. 7, the sandwiched PTO unit 200 includes a first adapter, shown as prime mover adapter plate 280, a dampening element, shown as dampener 290, a connector or coupler, shown as connector sleeve 300, and a second adapter, shown as transmission adapter plate 310. The prime mover adapter plate 280 defines (i) a first interface, shown as prime mover interface 282, coupled to the prime mover output 112, (ii) a second interface, shown as dampener interface 284, that receives and couples to a portion of the dampener 290, and (iii) a first aperture, shown as central bore 286, that receives the input end 212 of the main drive shaft 210. The dampener 290 includes (i) a first portion, shown as adapter plate portion 292, received by and coupled to the dampener interface 284 of the prime mover adapter plate 280 and (ii) a second portion, shown as sleeve portion 294, that defines a second aperture, shown as central bore 296, that receives a portion of the connector sleeve 300. According to an exemplary embodiment, the dampener 290 is configured to dampen vibrational forces generated by the prime mover 110 such that such vibrational forces are mitigated or eliminated and do not propagate throughout the sandwiched PTO unit 200 (e.g., which reduces rattling of the gears, reduces component wear, etc.).

As shown in FIG. 7, the connector sleeve 300 includes (i) a first portion, shown as dampener interface 302, that extends into the central bore 296 of the dampener 290 to couple the dampener 290 to the connector sleeve 300, (ii) a second portion, shown as shaft interface 304, the engages with a portion of the main drive shaft 210 positioned along a length thereof (e.g., a portion proximate a middle of the main drive shaft 210 but closer to the input end 212 thereof) to couple the main drive shaft 210 to the connector sleeve 300, and (iii) a third portion, shown as clutch interface 306, that engages with a housing, shown as clutch housing 272, of the pump clutch 270 to couple the pump clutch 270 to the connector sleeve 300. The connector sleeve 300 defines a central passage, and similarly the dampener 290 defines the central bore 296, through which the input end 212 of the main drive shaft 210 extends such that (i) the input end 212 is positioned on an upstream or prime mover side of the dampener 290 and the connector sleeve 300 and (ii) the output end 214 of the main drive shaft 210 is positioned on a downstream or transmission side of the dampener 290 and the connector sleeve 300. As shown in FIG. 7, the transmission adapter plate 310 couples the output end 214 of the main drive shaft 210 to the transmission input 132 of the transmission 130.

As shown in FIG. 7, the clutch housing 272 of the pump clutch 270 contains a plurality of clutch plates, shown as clutch plates 274. According to an exemplary embodiment, when the pump clutch 270 is engaged, the clutch plates 274 couple the clutch housing 272, and therefore, the connector sleeve 300, to the drive gear 230 such that rotation of the connector sleeve 300 is imparted to the pump gear train 220 and the pump drive shaft 260 to drive the pump system 60 with the prime mover 110. In one embodiment, the clutch plates 274 are spring biased into a disengaged position and the pump clutch 270 is fluidly operated to overcome the spring bias such that the clutch plates 274 engage with the drive gear 230. In some embodiments, the main drive shaft 210 defines an internal passage that fluidly connects the pump clutch 270 to a fluid source (e.g., a fluid pump, a hydraulic pump, etc.) where the fluid source provides a fluid (e.g., a hydraulic fluid, etc.) to the pump clutch 270 to overcome the spring bias and engage the pump clutch 270. In other embodiments, the pump clutch 270 receives fluid in another suitable manner and/or is otherwise activated/engaged.

According to an exemplary embodiment, when the prime mover 110 provides an input to the sandwiched PTO unit 200 via the prime mover output 112 and the pump clutch 270 is disengaged, the prime mover output 112 drives the prime mover adapter plate 280, the prime mover adapter plate 280 drives the dampener 290, the dampener 290 drives the connector sleeve 300, the connector sleeve 300 drives the main drive shaft 210 and the clutch housing 272 (but not the pump gear train 220), and the main drive shaft 210 drives the transmission adapter plate 310 and the transmission input 132 such that the prime mover adapter plate 280, the dampener 290, the connector sleeve 300, the main drive shaft 210, the transmission adapter plate 310, and the transmission input 132 rotate together so that the prime mover 110 drives the transmission 130 but not the pump gear train 220, the pump drive shaft 260, or the pump system 60.

According to an exemplary embodiment, when the prime mover 110 provides an input to the sandwiched PTO unit 200 via the prime mover output 112 and the pump clutch 270 is engaged, the prime mover output 112 drives the prime mover adapter plate 280, the prime mover adapter plate 280 drives the dampener 290, the dampener 290 drives the connector sleeve 300, the connector sleeve 300 drives the main drive shaft 210 and the clutch housing 272, the main drive shaft 210 drives the transmission adapter plate 310 and the transmission input 132, the clutch housing 272 drives the clutch plates 274, the clutch plates 274 drive the drive gear 230, the drive gear 230 drives the idler gear 240, the idler gear 240 drives the output gear 250, the output gear 250 drives the pump drive shaft 260, and the pump drive shaft 260 drives the pump system 60 such that the prime mover adapter plate 280, the dampener 290, the connector sleeve 300, the main drive shaft 210, the transmission adapter plate 310, the transmission input 132, the pump clutch 270, the pump gear train 220, and the pump drive shaft 260 rotate together so that the prime mover 110 drives the transmission 130 and the pump system 60.

Figure 8:
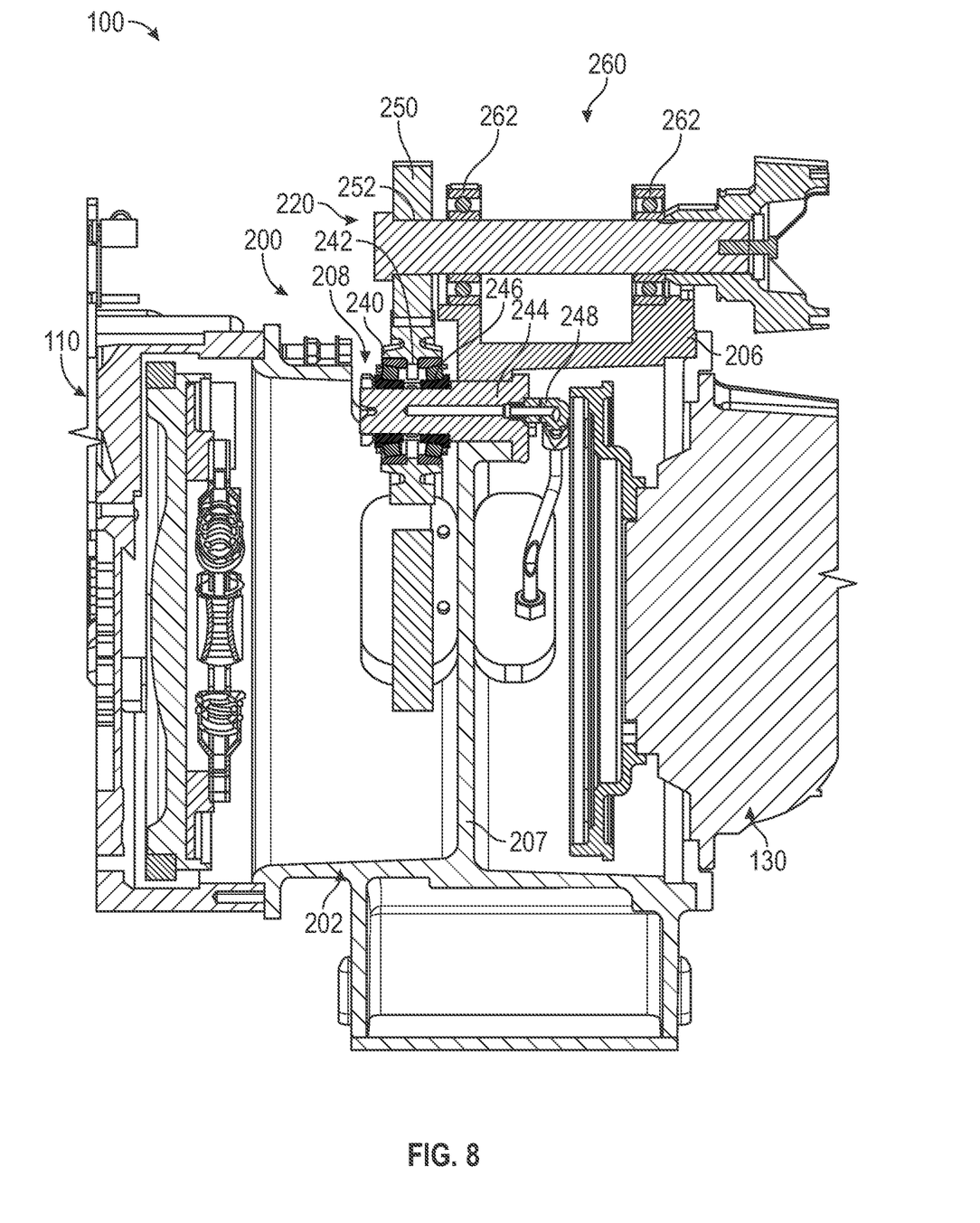
FIG. 8 is a second cross-sectional view of the portion of the driveline of FIG. 7, according to an exemplary embodiment.

As shown in FIGS. 7 and 8, the main housing 202 includes a support, shown as support rib 207, extending from the main housing 202 and into the main chamber 204 thereof. As shown in FIG. 7, the support rib 207 supports a first bearing, shown as main drive shaft bearing 216, positioned along the main drive shaft 210 proximate the output end 214 of the main drive shaft 210 (such that the main drive shaft 210 extends through the support rib 207). According to the exemplary embodiment, the main drive shaft 210 does not include a similar bearing positioned proximate the input end 212 of the main drive shaft 210. Rather, the drive gear 230, the idler gear 240, and the output gear 250 are cut to have a specific helical angle pattern such that the loading imparted onto the main drive shaft 210 and, therefore, onto the prime mover output 112 by the pump gear train 220 is substantially straight down, and not laterally into the prime mover output 112, such that a bearing proximate the input end 212 of the main drive shaft 210 is not necessary to support the loading. Eliminating the need for a bearing proximate the input end 212 of the main drive shaft 210 permits reducing the overall length of the sandwiched PTO unit 200 and, thereby, the overall length of the driveline 100 (e.g., such that the fire apparatus 10 can have a shorter wheel base). By way of example, adding a bearing proximate the input end 212 of the main drive shaft 210 would require extending the length of the sandwiched PTO unit 200 approximately four to six inches to accommodate proper packaging of an additional bearing with the remaining components of the sandwiched PTO unit 200.

As shown in FIG. 7, the drive gear 230 defines an aperture, shown as central bore 232, through which the main drive shaft 210 extends and that receives a second bearing, shown as drive gear bearing 236. According to an exemplary embodiment, the drive gear bearing 236 permits relative rotation between the main drive shaft 210 and the drive gear 230 when the pump clutch 270 is disengaged.

As shown in FIG. 8, the support rib 207 supports an auxiliary shaft, shown as idler shaft 244. The idler gear 240 defines an aperture, shown as central bore 242, through which the idler shaft 244 extends and that receives a third bearing, shown as idler gear bearing 246. According to an exemplary embodiment, the idler gear bearing 246 permits rotation of the idler gear 240 about the idler shaft 244. As shown in FIG. 8, the idler shaft 244 defines an internal passage that couples to a conduit, shown as lubrication conduit 248, which is coupled to a lubrication pump. According to an exemplary embodiment, the lubrication pump is configured to provide lubrication (e.g., oil) to the internal passage of the idler shaft 244, which directs the lubrication to the idler gear 240 to keep the idler gear 240 (and the drive gear 230 and/or the output gear 250) properly lubricated. As shown in FIGS. 7 and 8, the output gear 250 defines an aperture, shown as central bore 252, that receives a portion of the pump drive shaft 260 to couple the output gear 250 thereto. As shown in FIG. 8, the sandwiched PTO unit 200 includes fourth bearings, shown as pump drive shaft bearings 262, supported by the pump output housing 206 and coupled to and supporting the pump drive shaft 260.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrase "at least one of X, Y, and Z" and "at least one of X, Y, or Z," unless specifically stated otherwise, is understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein.

The invention claimed is:

1. A fire apparatus comprising:
   a chassis;
   a cab coupled to the chassis;
   a pump system coupled to the chassis and positioned at least partially behind the cab, the pump system including a pump; and
   a driveline including:
      a prime mover positioned beneath the cab and coupled to the chassis;
      a transmission; and
      a sandwiched power take-off unit positioned between (a) the prime mover and (b) the transmission and the pump system;
   wherein the sandwiched power take-off unit facilitates operating the pump independent of a gear selection of the transmission and a ground speed of the fire apparatus; and
   wherein the sandwiched power take-off unit includes:
      a main drive shaft positioned between the prime mover and the transmission;
      a pump drive shaft coupled to the pump; and
      a gear train including a plurality of gears that couple the main drive shaft to the pump drive shaft, wherein the gear train includes a drive gear defining an aperture that receives the main drive shaft; and
      a bearing received by the aperture and positioned between the main drive shaft and the drive gear.

2. The fire apparatus of claim 1, wherein the sandwiched power take-off unit is positioned at least partially beneath the cab.

3. The fire apparatus of claim 1, wherein the pump system is positioned at least partially beneath the cab.

4. The fire apparatus of claim 1, wherein the sandwiched power take-off unit includes a clutch positioned to decouple the prime mover from the pump.

5. The fire apparatus of claim 4, wherein the clutch is positioned outside of a housing of the sandwiched power take-off unit.

6. The fire apparatus of claim 1, wherein the sandwiched power take-off unit includes a main housing, wherein the main drive shaft is positioned inside of the main housing, the pump drive shaft is positioned outside of the main housing, and the gear train extends from the main drive shaft, through an aperture in the main housing, and to the pump drive shaft.

7. A fire apparatus comprising:
   a chassis;
   a cab coupled to the chassis;
   a pump system coupled to the chassis and positioned at least partially behind the cab, the pump system including a pump; and
   a driveline including:
      a prime mover positioned beneath the cab and coupled to the chassis;
      a transmission; and
      a sandwiched power take-off unit positioned between (a) the prime mover and (b) the transmission and the pump system;
   wherein the sandwiched power take-off unit facilitates operating the pump independent of a gear selection of the transmission and a ground speed of the fire apparatus; and
   wherein the sandwiched power take-off unit includes:
      a main drive shaft positioned between the prime mover and the transmission;
      a pump drive shaft coupled to the pump;
      a gear train including a plurality of gears that couple the main drive shaft to the pump drive shaft, wherein the gear train includes a drive gear coupled to the main drive shaft, an output gear coupled to the pump drive shaft, and an intermediate gear positioned between the drive gear and the output gear;
      a main housing having a support extending through an interior chamber thereof; and
      an auxiliary shaft received by the support, wherein the intermediate gear is disposed on the auxiliary shaft, and wherein the auxiliary shaft defines a fluid passage that facilitates fluidly coupling the intermediate gear to a lubrication source.

8. A fire apparatus comprising:
a chassis;
a cab coupled to the chassis;
a pump system coupled to the chassis and positioned at least partially behind the cab, the pump system including a pump; and
a driveline including:
a prime mover positioned beneath the cab and coupled to the chassis;
a transmission; and
a sandwiched power take-off unit positioned between (a) the prime mover and (b) the transmission and the pump system;
wherein the sandwiched power take-off unit facilitates operating the pump independent of a gear selection of the transmission and a ground speed of the fire apparatus; and
wherein the sandwiched power take-off unit includes:
a main drive shaft positioned between the prime mover and the transmission;
a pump drive shaft coupled to the pump;
a gear train including a plurality of gears that couple the main drive shaft to the pump drive shaft;
a sleeve disposed along the main drive shaft; and
an adapter plate coupled to an output of the prime mover and the sleeve.

9. The fire apparatus of claim 8, wherein the sandwiched power take-off unit includes a dampener positioned between the sleeve and the adapter plate.

10. The fire apparatus of claim 9, wherein the sleeve defines a central passage through which the main drive shaft extends, and wherein the sleeve includes a first portion that engages with a central bore of the dampener and a second portion that engages with the main drive shaft.

11. The fire apparatus of claim 10, wherein the sandwiched power take-off unit includes a clutch, wherein the sleeve includes a third portion, and wherein the clutch is positioned between the third portion of the sleeve and the gear train.

12. The fire apparatus of claim 11, wherein the clutch has a spring bias that biases the clutch into disengagement with the gear train.

13. The fire apparatus of claim 12, wherein the clutch is fluidly operated to overcome the spring bias.

14. The fire apparatus of claim 13, wherein the main drive shaft defines a fluid passage that facilitates fluidly coupling the clutch to a fluid source.

15. The fire apparatus of claim 8, wherein the sandwiched power take-off unit includes:

a main housing having a support extending through an interior chamber thereof; and
a bearing received by the support and disposed along the main drive shaft at a position closer to the transmission than the prime mover.

16. The fire apparatus of claim 15, wherein the adapter plate defines a central bore that receives an end of the main drive shaft proximate the prime mover, and wherein the sandwiched power take-off unit does not include a bearing positioned within the central bore that engages with the end of the main drive shaft.

17. A vehicle comprising:
a vehicle accessory; and
a driveline including:
a prime mover;
a transmission; and
a sandwiched power take-off unit positioned between (a) the prime mover and (b) the transmission and the vehicle accessory, the sandwiched power take-off unit including:
a main housing defining an interior chamber, the main housing have a support extending through the interior chamber;
a main drive shaft disposed within the interior chamber and extending through the support;
a power take-off drive shaft coupled to the vehicle accessory;
a gear train including a drive gear coupled to the main drive shaft, an output gear coupled to the power take-off drive shaft, and an intermediate gear positioned between the drive gear and the output gear;
an adapter plate coupled to an output of the prime mover, the adapter plate defining a central bore that receives an end of the main drive shaft without a bearing positioned therebetween;
a first bearing positioned between the main drive shaft and the drive gear;
a second bearing positioned between the main drive shaft and the support;
an auxiliary shaft received by the support, wherein the intermediate gear is disposed on the auxiliary shaft; and
a clutch positioned to facilitate selectively disconnecting the vehicle accessory from the main drive shaft.

* * * * *